United States Patent [19]
Valtonen

[11] 3,831,130
[45] Aug. 20, 1974

[54] COUPLING ELEMENT FOR AN ELECTRIC CURRENT SUPPLY CONDUIT

[75] Inventor: Rainer Iikka Tapio Valtonen, Espoo, Finland

[73] Assignee: Oy Nokia Ab, Helsinki, Finland

[22] Filed: Feb. 22, 1973

[21] Appl. No.: 334,882

[52] U.S. Cl. .......................................... 339/21 R
[51] Int. Cl. ............................................ H01r 9/00
[58] Field of Search ......... 339/14 R, 20, 21 R, 21 S, 339/22 T, 23, 24

[56] References Cited
UNITED STATES PATENTS

| | | | |
|---|---|---|---|
| 3,601,748 | 8/1971 | Hart et al. | 339/14 R |
| 3,605,064 | 9/1971 | Routh et al. | 339/21 R |
| 3,622,938 | 11/1971 | Ito et al. | 339/21 R |

Primary Examiner—Bobby R. Gay
Assistant Examiner—Robert A. Hafer
Attorney, Agent, or Firm—Eric H. Waters

[57] ABSTRACT

A coupling element for an electric current supply conduit comprising a metal support rail of substantially U-shaped cross-section forming an open longitudinal channel. The opposite side walls of the support rail is provided with longitudinally extending current conductors terminating a short distance inside the ends of the support rail. The coupling element comprises a body which can be removably inserted into said open channel from the end of the support rail and provided with contacts for connection with the ends of the current conductors. The body is provided with projections or similar which abut against the ends of the current conductors and prevent the coupling element from being inserted into the support rail if said ends of the current conductors extend to the end surface of the supply rail.

3 Claims, 5 Drawing Figures

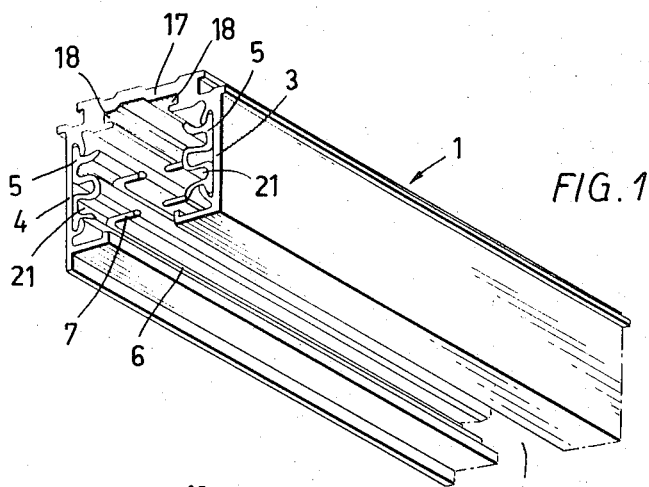
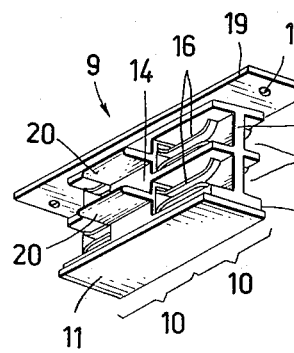
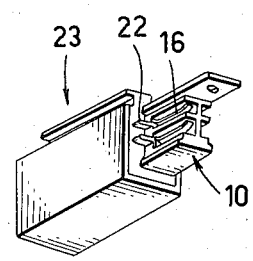
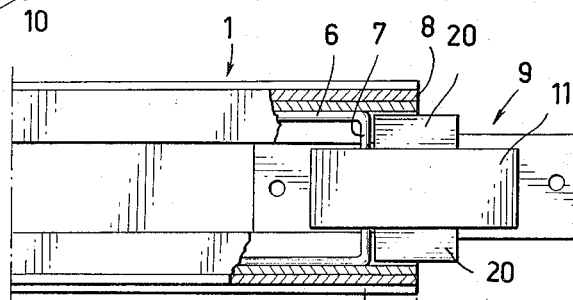
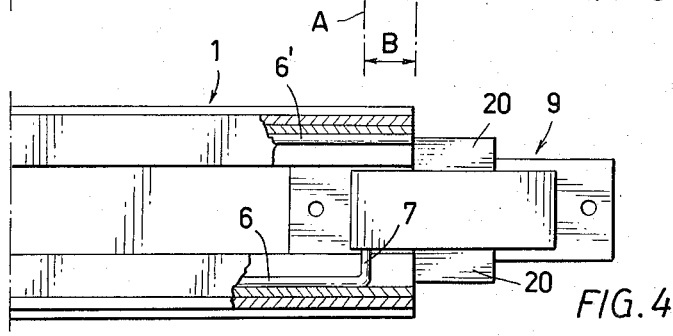

COUPLING ELEMENT FOR AN ELECTRIC CURRENT SUPPLY CONDUIT

The present invention relates to a coupling element for an electric current supply conduit, which current supply conduit comprises a metal support rail forming an open longitudinal channel and longitudinally extending current conductors fastened at the support rail, the ends of which conductors are placed at a distance inside the end surface of the support rail, whereby the coupling element comprises a body that can be removably inserted in the said open channel at the end of the support rail, which body is provided with contacts for connecting the ends of the current conductors.

In similar current conduits so far known the current conductors have usually been located on both side walls of an open longitudinal channel in a U-shaped support rail through the intermediate of plastics insulating strips. Supply conduits have been manufactured in certain standard lengths from which the required supply conduit systems have been constructed at the installation site, by means of specially designed couplers. The ends of the standard lengths have been so prepared at the factory that the plastics insulation strips extend approx. 5–15 mm beyond the end of the metal support rail and the current conductors likewise extend another 5–15 mm beyond the ends of the plastics insulating strips. The ends of the conductors thus fit directly into the couplers being used.

It is almost impossible to cut and prepare a ready made supply conduit on site without damaging the insulation strips or the current conductors. However, it would be most desirable for the supply conduits to be delivered in only a few standard lengths from which the required length could then be cut to fit the supply conduit system.

The simplest solution here would be that the supply conduits could be cut perpendicularly to their lengths and the couplers attached directly to the end of the supply conduit in this way cut. The thickness of the insulating strip in current supply conduits is, however, generally so small that the length of the leakage path between the conductors and the rail over the cut surface of the insulating strip, i.e. the uninsulated distance from the conductors to the support rail along the cut surface of the insulation, would be too short at the ends of supply rails cut perpendicularly.

In a known design of current supply conduit this problem has been solved by cutting off a desired length at the end of each current conductor so as to increase the distance of the end of the current conductor from the end of the cut current supply conduit.

In another design of current supply conduit, which is the subject of a patent application of the applicants, filed at the same time with the present application, the problem of leakage path has been approached by bending the current conductors at their ends into an angle making them project into the open longitudinal channel of the support rail. In this way the ends of the current conductors are also in a simple way positioned at a distance, from the viewpoint of the leakage path sufficient, from the end of the cut current supply conduit.

Both of the above methods of lengthening the leakage path by cutting off or by bending the ends of current conductors are, however, in practice connected with the risk that the electrician may, out of one reason or another, after cutting the support rail forget to shorten or to bend one or more ends of current conductors before the coupling element is inserted in position in the support rail.

A purpose of the present invention is to provide a coupling element by means of which the above risk can be avoided, and this is achieved by means of a coupling element in accordance with the invention, which is characterized in that the body of the coupling element is per each contact provided with a projection or equivalent, which projections are located in the body in such mutual positions that they, when the body is in position in the support rail, lie in the axial lines of the current conductors.

In accordance with the invention a coupling element is provided ehich by simple means ensures that the coupling element cannot be inserted in position in the support rail unless the ends of all the current conductors have been shortened or bent. The projections formed in the body of the coupling element, namely, toss against the end of such current conductor or conductors that has not been shortened or bent in advance, so that the insertion of the coupling element is prevented. The projections of the coupling unit also prevent the coupling element from being inserted deep enough in the support rail in the case that the shortening or bending of the ends of the current conductors has been carried out erroneously so that the leakage path has remained too short.

The invention will be described more closely below with reference to the attached drawing, wherein FIG. 1 is a perspective view of a current supply conduit for which the coupling element shown in FIG. 2 has been designed, FIG. 2 is a perspective view of a favourable embodiment of the coupling element in accordance with the invention as designed as a coupling box, FIG. 3 shows the coupling element as inserted in position in the current supply conduit in partial section, FIG. 4 shows the coupling element as inserted in a wrong current supply conduit in partial section, and FIG. 5 is a perspective view of another embodiment of the coupling element as designed as a supply box.

The current supply conduit shown in FIGS. 1 and 3, 4 comprises a metallic support rail 1, acting as a support construction and being, for example, an extruded aluminium section. The support rail has a U section and forms a longitudinal open channel 2 for the insertion of the current connecting plug. The two side walls 3, 4 of the support rail are provided with longitudinal plastics insulating strips 5, in whose longitudinal grooves current conductors 6, for example of copper, are embedded. Such a supply conduit and a connecting plug designed for same are described, for example, in the Finnish Patent No. 40,644.

The end 7 of each current conductor is bent so as to be positioned in substantially the same level A (FIG. 3), perpendicular to the longitudinal direction of the support rail, which plane is at a distance B (FIG. 3) inwards from the cutting surface 8 of the support rail. Thus the ends of the current conductors extend mutually parallelly towards each other and project from the insulating strips 5 into the open channel 2 of the support rail.

FIG. 2 of the drawing shows a coupling box suitable for a current supply conduit of the type described above, which box is intended for coupling two supply conduits together end to end. Here the coupling box 9 in principle consists of two combined coupling elements 10 of opposite directions, the said element comprising a parallellopiped-shaped body 11 provided with a number of contact socket holes 12, which are in pairs open towards one end face 13 and towards one side face 14 or 15, respectively, as comes out from FIG. 2. Each socket hole is provided with a contact 16, which is fastened resiliently onto the body 11 so that the plier-shaped contact tongues of the contact spring in planes parallel to the side faces 14, 15 of the body.

The coupling box is intended to be pushed halfway into the end of the support rail of the supply conduit into longitudinal guide grooves 18 formed in the rail so that the side faces 14, 15 of the body are parallel with the side walls 3, 4 of the support rail and the resilient fastening plate 19 fastened to the body is parallel with the bottom wall 17 (FIG. 1) of the support rail. The depth of the contact holes 12 is here dimensioned so as to substantially correspond to the bending distance B (FIG. 3) of the current conductors.

As comes out in particular from FIGS. 2 and 3, both side faces 14, 15 of the body of the coupling box are at each contact hole provided with a projection consisting of a ridge 20. The ridges 20 are here positioned at such distances from each other as correspond to the distances between current conductors 6 arranged in pairs so that the ridges penetrate into the grooves 21 (FIG. 1) formed in the insulating strips 5 for the current conductors when the coupling box is inserted in position in the end of the support rail, as is shown in FIG. 3. The outer edges of the ridges thus lie on the axial line of each current conductor.

By means of these ridges it is possible to prevent the coupling box from being inserted in the support rail if one or more of its current conductors 6 have not been bent. As is shown in FIG. 4, the ridge 20 tosses then against the end of an unbent current conductor 6' so that the insertion of the coupling box is prevented.

The projections preventing the insertion of the coupling element 10 may also consist of simple elevations 22, as is shown in the supply box 23 in FIG. 5. In principle it comprises a coupling element 10 of the type described above, provided with contacts 16.

The couplin element and the supply box can be fastened to the support rail of the current supply conduit by means of screws threaded into the holes 19' at the end of the fastening plate 19.

The coupling elements can also be formed into X and T coupling boxes, contact pieces, and equivalent, whereby all of these are preferably provided with projections of the type described above.

The drawing and the related specification are only intended to illustrate the idea of the invention. In its details the coupling element in accordance with the invention may show even considerable variability within the patent claims. Thus, such coupling elements as are intended for current supply conduits in which pieces of suitable length are cut off from the ends of the current conductors so as to lengthen the leakage path can also be provided with projections in accordance with the invention. In stead of being round, the current conductors may also be flat.

What I claim is:

1. In combination a coupling element, and an electric current supply conduit, said current supply conduit comprising a metal support rail forming an open longitudinal channel and longitudinally extending current conductors fastened at said support rail, the ends of said conductors being placed at a predetermined distance inside the end surface of said support rail, the ends of said conductors bent inwardly, transverse of their longitudinal axis, the coupling element comprising a body that is removably inserted in said open channel at the end of said support rail, said body being provided with contacts connecting to the ends of said current conductors, said body of the coupling element providing adjacent each contact a projection, the projections being located in the body in such respective positions so that when the body is in position in said support rail, said projections lie in the axial lines of said current conductors, and insulating strip means with longitudinal grooves encompassing each current conductor, each projection sliding axially into a respective longitudinal groove as the coupling element is inserted in said support rail, and said contacts engage said ends of said conductors said projections being free from contact with said current conductors when the end portions of said current conductors are positioned inwardly with respect to their longitudinal axis and the coupling element is pushed in its coupling position in the rail whereby, a projection will abut the end portion of a respective current conductor when said end portion remains unshortened so as to prevent the coupling element from being pushed to its coupling position in said rail when at least one current conductor is left unshortened.

2. A combination in accordance with claim 1, wherein said projections comprise respective parallel ridges.

3. A combination in accordance with claim 2, wherein said projections comprise individual elevations.

* * * * *